(12) United States Patent
Piersol

(10) Patent No.: US 8,479,004 B2
(45) Date of Patent: Jul. 2, 2013

(54) PAPER-BASED DOCUMENT LOGGING

(75) Inventor: Kurt W. Piersol, Campbell, CA (US)

(73) Assignee: Ricoh Co., Ltd, Tokyo (JP)

( * ) Notice: Subject to any disclaimer, the term of this patent is extended or adjusted under 35 U.S.C. 154(b) by 1500 days.

(21) Appl. No.: 11/514,711

(22) Filed: Aug. 31, 2006

(65) Prior Publication Data

US 2008/0059800 A1  Mar. 6, 2008

(51) Int. Cl.
*G06F 7/04* (2006.01)
*G06F 17/30* (2006.01)
*G06F 11/00* (2006.01)

(52) U.S. Cl.
USPC ........... 713/176; 713/179; 713/180; 713/181; 726/31; 726/34; 380/55

(58) Field of Classification Search
USPC ................ 713/176, 179, 180, 181; 726/31, 726/34; 380/55
See application file for complete search history.

(56) References Cited

U.S. PATENT DOCUMENTS

| | | |
|---|---|---|
| 4,809,158 A | 2/1989 | McCauley |
| 5,396,622 A | 3/1995 | Lee et al. |
| 5,495,608 A | 2/1996 | Antoshenkov |
| 5,592,618 A | 1/1997 | Micka et al. |
| 5,708,780 A | 1/1998 | Levergood et al. |
| 5,778,388 A | 7/1998 | Kawamura et al. |
| 5,845,292 A | 12/1998 | Bohannon et al. |
| 5,949,876 A | 9/1999 | Ginter et al. |
| 5,978,475 A | 11/1999 | Schneier et al. |
| 6,044,381 A | 3/2000 | Boothby |
| 6,065,018 A | 5/2000 | Beier et al. |
| 6,192,365 B1 | 2/2001 | Draper et al. |
| 6,236,988 B1 | 5/2001 | Aldred |
| 6,289,356 B1 | 9/2001 | Hitz et al. |
| 6,308,175 B1 | 10/2001 | Lang et al. |
| 6,341,316 B1 | 1/2002 | Kloba et al. |
| 6,345,288 B1 | 2/2002 | Reed et al. |
| 6,360,215 B1 | 3/2002 | Judd et al. |
| 6,363,363 B1 | 3/2002 | Haller et al. |
| 6,400,845 B1 * | 6/2002 | Volino ........................ 382/176 |
| 6,418,421 B1 | 7/2002 | Hurtado et al. |
| 6,463,427 B1 | 10/2002 | Wu |
| 6,499,665 B1 * | 12/2002 | Meunier et al. ............... 235/487 |
| 6,522,770 B1 * | 2/2003 | Seder et al. .................. 382/100 |
| 6,546,385 B1 | 4/2003 | Mao et al. |

(Continued)

FOREIGN PATENT DOCUMENTS

| | | |
|---|---|---|
| EP | 0 443 972 | 8/1991 |
| EP | 1 594 252 | 11/2005 |

(Continued)

OTHER PUBLICATIONS

Lee, Jae-il et al. "A Model for Embedding and Authorizing Digital Signatures in Printed Documents", 2002.*

(Continued)

*Primary Examiner* — Michael Simitoski
(74) *Attorney, Agent, or Firm* — Blakely, Sokoloff, Taylor & Zafman LLP

(57) ABSTRACT

A method and apparatus are disclosed herein for paper-based document logging. In one embodiment, the method comprises scanning bits of a document, generating a cryptographic hash, converting the cryptographic hash into a machine readable code, and rewriting the document with the code contained thereon.

19 Claims, 10 Drawing Sheets

U.S. PATENT DOCUMENTS

| | | |
|---|---|---|
| 6,557,004 B1 | 4/2003 | Ben-Shachar et al. |
| 6,574,627 B1 | 6/2003 | Bergadano et al. |
| 6,584,477 B1 | 6/2003 | Moser, Jr. |
| 6,615,208 B1 | 9/2003 | Behrens et al. |
| 6,631,469 B1 | 10/2003 | Silvester |
| 6,631,496 B1 | 10/2003 | Li et al. |
| 6,640,301 B1 | 10/2003 | Ng |
| 6,661,933 B1* | 12/2003 | Hisatomi et al. ............... 382/306 |
| 6,687,696 B2 | 2/2004 | Hofmann et al. |
| 6,697,948 B1 | 2/2004 | Rabin et al. |
| 6,754,773 B2 | 6/2004 | Ulrich et al. |
| 6,771,885 B1 | 8/2004 | Agnihotri et al. |
| 6,807,632 B1 | 10/2004 | Carpentier et al. |
| 6,862,728 B2 | 3/2005 | Darnell et al. |
| 7,054,626 B2 | 5/2006 | Rossman et al. |
| 7,203,796 B1 | 4/2007 | Muppalaneni et al. |
| 7,249,258 B2 | 7/2007 | Honda et al. |
| 7,278,115 B1 | 10/2007 | Conway et al. |
| 7,340,450 B2 | 3/2008 | Sugahara et al. |
| 7,406,487 B1 | 7/2008 | Gupta et al. |
| 7,478,120 B1 | 1/2009 | Zhang |
| 7,555,196 B1 | 6/2009 | Crawford et al. |
| 7,574,605 B2 | 8/2009 | Tanimoto et al. |
| 7,806,342 B2* | 10/2010 | Lapstun et al. ............... 235/494 |
| 7,853,564 B2 | 12/2010 | Mierau et al. |
| 7,890,598 B2 | 2/2011 | Lakamp |
| 7,962,546 B2 | 6/2011 | Colon |
| 2002/0004800 A1* | 1/2002 | Kikuta et al. .................. 707/500 |
| 2002/0023221 A1 | 2/2002 | Miyazaki et al. |
| 2002/0046072 A1 | 4/2002 | Arai et al. |
| 2002/0055942 A1 | 5/2002 | Reynolds |
| 2002/0095454 A1 | 7/2002 | Reed et al. |
| 2002/0103848 A1 | 8/2002 | Giacomini et al. |
| 2002/0116379 A1* | 8/2002 | Lee et al. ........................... 707/5 |
| 2002/0120484 A1 | 8/2002 | Bantz et al. |
| 2002/0126872 A1 | 9/2002 | Brunk et al. |
| 2002/0184180 A1* | 12/2002 | Debique et al. .................... 707/1 |
| 2003/0016980 A1* | 1/2003 | Meunier et al. ................. 400/76 |
| 2003/0021441 A1* | 1/2003 | Levy et al. .................... 382/100 |
| 2003/0021677 A1 | 1/2003 | Masutani |
| 2003/0046586 A1 | 3/2003 | Bheemarasetti et al. |
| 2003/0050863 A1 | 3/2003 | Radwin |
| 2003/0053655 A1 | 3/2003 | Barone et al. |
| 2003/0083040 A1 | 5/2003 | Ruth et al. |
| 2003/0088593 A1 | 5/2003 | Stickler |
| 2003/0123447 A1 | 7/2003 | Smith |
| 2003/0126148 A1 | 7/2003 | Gropper et al. |
| 2003/0126276 A1 | 7/2003 | Kime et al. |
| 2003/0131240 A1 | 7/2003 | Greene et al. |
| 2003/0145207 A1* | 7/2003 | Jakobsson et al. ............ 713/176 |
| 2003/0158944 A1 | 8/2003 | Branson et al. |
| 2003/0191764 A1* | 10/2003 | Richards ........................ 707/100 |
| 2003/0212677 A1 | 11/2003 | Chen et al. |
| 2003/0236857 A1 | 12/2003 | Takase et al. |
| 2004/0030681 A1 | 2/2004 | Shannon et al. |
| 2004/0064693 A1 | 4/2004 | Pabla et al. |
| 2004/0064833 A1 | 4/2004 | Lee et al. |
| 2004/0068652 A1* | 4/2004 | Carpentier et al. ........... 713/168 |
| 2004/0075866 A1 | 4/2004 | Thormodsen et al. |
| 2004/0078337 A1* | 4/2004 | King et al. ....................... 705/51 |
| 2004/0088332 A1* | 5/2004 | Lee et al. ....................... 707/200 |
| 2004/0117627 A1* | 6/2004 | Brewington ................... 713/176 |
| 2004/0177067 A1 | 9/2004 | Takeda |
| 2004/0177281 A1 | 9/2004 | Balaz et al. |
| 2004/0220975 A1* | 11/2004 | Carpentier et al. ........... 707/200 |
| 2004/0225655 A1 | 11/2004 | Moulton |
| 2004/0244039 A1* | 12/2004 | Sugahara et al. ............... 725/52 |
| 2004/0260593 A1 | 12/2004 | Abraham-Fuchs et al. |
| 2005/0038756 A1* | 2/2005 | Nagel ............................ 705/76 |
| 2005/0038809 A1 | 2/2005 | Abajian et al. |
| 2005/0055343 A1 | 3/2005 | Krishnamurthy |
| 2005/0071209 A1 | 3/2005 | Tatavu et al. |
| 2005/0091229 A1 | 4/2005 | Bali et al. |
| 2005/0114452 A1 | 5/2005 | Prakash |
| 2005/0114709 A1 | 5/2005 | Moore |
| 2005/0210059 A1 | 9/2005 | Albornoz et al. |
| 2005/0262243 A1 | 11/2005 | Ternasky et al. |
| 2005/0267885 A1 | 12/2005 | Klier |
| 2005/0289187 A1 | 12/2005 | Wong et al. |
| 2006/0010095 A1* | 1/2006 | Wolff et al. ........................ 707/1 |
| 2006/0036579 A1 | 2/2006 | Byrd et al. |
| 2006/0047967 A1 | 3/2006 | Akhan et al. |
| 2006/0056653 A1* | 3/2006 | Kunisa ........................... 382/100 |
| 2006/0093241 A1 | 5/2006 | Nakamura et al. |
| 2006/0101007 A1 | 5/2006 | Go |
| 2006/0129576 A1 | 6/2006 | Carpentier et al. |
| 2006/0139622 A1 | 6/2006 | Mann |
| 2006/0149558 A1 | 7/2006 | Kahn et al. |
| 2006/0150079 A1 | 7/2006 | Albornoz et al. |
| 2006/0195886 A1 | 8/2006 | Ashley |
| 2006/0218204 A1 | 9/2006 | Ofer et al. |
| 2006/0230081 A1 | 10/2006 | Craswell et al. |
| 2006/0271787 A1* | 11/2006 | DeYoung et al. ............. 713/176 |
| 2007/0086061 A1* | 4/2007 | Robbins ........................ 358/400 |
| 2007/0094467 A1 | 4/2007 | Yamasaki |
| 2007/0143356 A1 | 6/2007 | Kleinsmith et al. |
| 2007/0170250 A1* | 7/2007 | Bystrom et al. ............... 235/382 |
| 2007/0219942 A1 | 9/2007 | Wolff et al. |
| 2007/0244920 A1 | 10/2007 | Palliyil et al. |
| 2008/0002243 A1* | 1/2008 | Cowburn ....................... 358/498 |
| 2008/0019505 A1 | 1/2008 | Thomas |
| 2008/0059800 A1* | 3/2008 | Piersol .......................... 713/176 |
| 2008/0071646 A1 | 3/2008 | Hodson et al. |
| 2008/0104407 A1 | 5/2008 | Horne et al. |
| 2008/0243688 A1 | 10/2008 | Hart et al. |
| 2008/0250100 A1 | 10/2008 | Hatanaka et al. |
| 2009/0089337 A1 | 4/2009 | Perlin et al. |
| 2009/0164506 A1 | 6/2009 | Barley et al. |
| 2009/0328218 A1 | 12/2009 | Tsurukawa |

FOREIGN PATENT DOCUMENTS

| | | |
|---|---|---|
| EP | 1 622 074 A1 | 2/2006 |
| JP | 2000-013586 A | 1/2000 |
| JP | 2001092827 | 4/2001 |
| JP | 2002-254770 A | 9/2002 |
| JP | 2006086778 | 3/2006 |
| WO | WO 03071394 | 8/2003 |

OTHER PUBLICATIONS

European Patent Office (Registered Letter) with Partial European Search Report for EP 07 25 3388, mailed Jan. 25, 2008 (5 pages).

Extended European Search Report for European Patent Application No. 07253388.8, dated May 5, 2006, 11 pages.

"ATTRIB," PC Computer Notes & Online Tutorials, <http://web.archive.org/web/20021204074423/http://www.pccomputernotes.com/operating_systems/dos04.htm>, Dec. 4, 2002, 5 pages.

Blanton, "Microsoft Computer Dictionary," Microsoft Press, Fifth Edition, Jan. 22, 2002, p. 578.

Chen, et al, "EFC—Event Correlation for Forensics," Internet Citation, [Online], Nov. 25, 2003, XP002441540, 11 pages.

European Search Report dated Apr. 18, 2007, for European Application No. 06027063.4-1527, 6 pages.

European Search Report dated Aug. 11, 2008, for European Application No. 08153379.6-1225, 7 pages.

European Search Report dated Oct. 31, 2008, for European Application No. 08153371.3, 7 pages.

Flickr, "Photo tags," http://web.archive.org/web/20040607054247/http://www.flickr.com/photos/tags/, Jun. 7, 2004, 1 page.

Google Search, <http://www.google.com/search?hl=en&rls=GGLD%2CGGLD%...h+values+as+identifiers &aq=f &aqi=aq1 =&oq=&gs_rfai=>, Apr. 7, 2010, 2 pages.

Hisashi, Toyoshima, et al, "Hysteresis Signature and its Related Technologies to Maintain the Digital Evidence for Network Activities in Future Soceity," Journal of the National Institute of Information and Communications Technology, vol. 52, Nos. 1/2, 2005, pp. 191-201.

Japanese Office Action for corresponding Japanese Patent Application No. 2005-198824, Mar. 8, 2011, 5 pages.

Li, Tao, et al, "An Integrated Framework on Mining Logs Files for Computing System Management," Proceedings of the Eleventh ACM SIGKDD International Conference on Knowledge Discover in Data Mining, [Online], Aug. 21, 2005-Aug. 24, 2005, pp. 776-781, XP002480863, Chicago, IL.

Phan, et al, "Challenge: Integrating Mobile Wireless Devices Into the Computational Grid," MOBICOM'02, Sep. 23-28, 2002, pp. 271-278.

Tkachenko, "Log file in XML format?," (http://www.tkachenko.com/blog/archives/000053.html) Jul. 22, 2003, 1-4.

U.S. Final Office Action for corresponding U.S. Appl. No. 11/804,435, Jun. 7, 2010, 11 pgs.

U.S. Final Office Action for corresponding U.S. Appl. No. 11/804,635, Jan. 7, 2010, 9 pgs.

U.S. Final Office Action for corresponding U.S. Appl. No. 10/887,998, Sep. 15, 2010, 16 pgs.

U.S. Final Office Action for corresponding U.S. Appl. No. 10/887,998, Nov. 17, 2009, 11 pgs.

U.S. Final Office Action for corresponding U.S. Appl. No. 10/887,998, Dec. 22, 2008, 9 pgs.

U.S. Final Office Action for corresponding U.S. Appl. No. 10/887,998, Jan. 8, 2008, 8 pgs.

U.S. Final Office Action for corresponding U.S. Appl. No. 11/322,435, dated Jun. 25, 2009.

U.S. Final Office Action for corresponding U.S. Appl. No. 11/322,435, dated May 7, 2010, 28 pgs.

U.S. Final Office Action for corresponding U.S. Appl. No. 11/322,435, dated Sep. 11, 2008, 26 pgs.

U.S. Final Office Action for corresponding U.S. Appl. No. 11/692,784, dated Feb. 3, 2009, 18 pgs.

U.S. Final Office Action for corresponding U.S. Appl. No. 11/692,784, dated Jun. 9, 2010, 19 pgs.

U.S. Office Action for corresponding U.S. Appl. No. 11/692,784 dated Apr. 13, 2011, 29 pgs.

U.S. Office Action for corresponding U.S. Appl. No. 11/804,435, Jun. 18, 2009, 10 pgs.

U.S. Office Action for corresponding U.S. Appl. No. 11/804,435, Dec. 30, 2009, 7 pgs.

U.S. Office Action for corresponding U.S. Appl. No. 11/804,435, Oct. 4, 2010, 11 pgs.

U.S. Office Action for corresponding U.S. Appl. No. 11/804,635 dated Apr. 27, 2011, 17 pgs.

U.S. Office Action for corresponding U.S. Appl. No. 11/804,635, Jun. 22, 2009, 9 pgs.

U.S. Office Action for corresponding U.S. Appl. No. 11/804,635, Jul. 22, 2010, 13 pgs.

U.S. Office Action for corresponding U.S. Appl. No. 10/887,998, May 11, 2009, 12 pgs.

U.S. Office Action for corresponding U.S. Appl. No. 10/887,998, Jul. 12, 2007, 8 pgs.

U.S. Office Action for corresponding U.S. Appl. No. 10/887,998, Mar. 30, 2007, 5 pgs.

U.S. Office Action for corresponding U.S. Appl. No. 10/887,998, Apr. 8, 2010, 11 pgs.

U.S. Office Action for corresponding U.S. Appl. No. 10/887,998, Jul. 28, 2008, 8 pgs.

U.S. Office Action for corresponding U.S. Appl. No. 11/322,435, dated Feb. 15, 2008, 24 pgs.

U.S. Office Action for corresponding U.S. Appl. No. 11/322,435, dated Jan. 30, 2009, 27 pgs.

U.S. Office Action for corresponding U.S. Appl. No. 11/322,435, dated Jan. 4, 2010, 26 pgs.

U.S. Office Action for corresponding U.S. Appl. No. 11/692,784, dated Aug. 5, 2008, 14 pgs.

U.S. Office Action for corresponding U.S. Appl. No. 11/692,784, dated Jul. 22, 2009, 20 pgs.

Japanese Office Action for related Japanese Patent Application No. 2007-224787, Sep. 4, 2012, 2 pgs.

Japanese Office Action for Japanese Application No. 2007-224787 dated May 8, 2012, English Bibliographic data included, 5 pages.

* cited by examiner

```
<doc SHA1 = A ... >
    <entry SEQ = 1
           SHA1 = C>
    First comment on doc A
    </entrfy>
    <entry SEQ = 2
           SHA1 = D
           HREF = URL
           SRC = URL>
    Another comment
    </entry
    ...
</doc>
``` http://RP.net/A/
XML listing of comments on document "a"

FIG. 3

PAPER-BASED DOCUMENT LOGGING

FIELD OF THE INVENTION

The present invention relates to the field of digital object distribution; more particularly, the present invention relates to processing documents to include hash marked pages or to process documents that have been previously hash marked.

BACKGROUND OF THE INVENTION

Millions of documents are sent back and forth every day. Substantial effort and time is spent in the overhead of addressing these documents. In the workplace, this substantial time and effort results in increased cost and expense.

Many document management systems have been proposed and implemented in the past. These document management systems include systems that store documents and handle the coordination of requests with responses.

Machine readable codes have been applied to documents in the past as a way to manage the documents. In one such a case, bar codes are used as identifiers for document retrieval. Unfortunately, this technique is susceptible to a sort of "transfer attack" where the machine readable code is removed from one document and pasted onto another. See U.S. Pat. No. 5,754,308, issued to Lopresti et al.

Furthermore, a machine readable code must always include some form of identifier, which is normally a numeric value or bit sequence of sufficient length to identify a document uniquely among many such documents. Choosing an appropriate identifier is a complex matter, and many techniques have been developed over many years. However, these techniques assume that the document is either being created from an electronic original, or chosen randomly, or chosen according to some counting scheme or complex sequencing algorithm. This can be useful in many cases, but does not relate the contents of a paper document to the chosen identifier.

SUMMARY OF THE INVENTION

A method and apparatus are disclosed herein for paper-based document logging. In one embodiment, the method comprises scanning bits of a document, generating a cryptographic hash, converting the cryptographic hash into a machine readable code, and rewriting the document with the code contained thereon.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 illustrates an exemplary sketch of a XML file that represents the log associated with a document;

DETAILED DESCRIPTION OF THE PRESENT INVENTION

Figure 1:
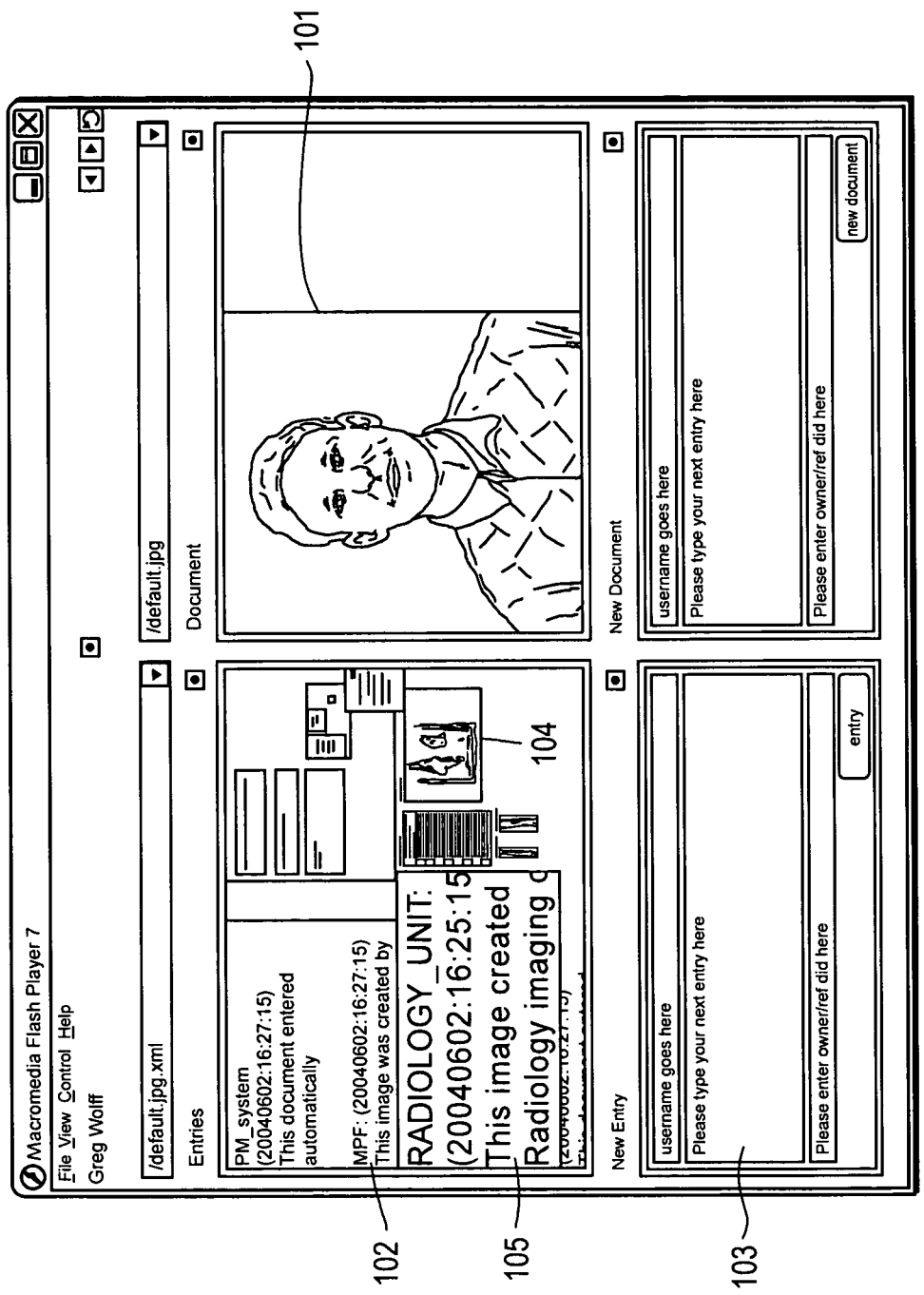
FIG. 1 illustrates an exemplary user interface.

Processes for scanning page images that will be logged and creating hash marked pages are described. In one embodiment, these processes include storing pages in a database and checking for known marks. In one embodiment, these page images are associated with information in a set of metadata entries that corresponds to a digital object (e.g., a document). This set is referred to herein as a document log. A document log has log entries of metadata. The metadata may comprise short text messages, data in binary format, and/or optional links entered by one or more people or automated systems. The document log may be distributed. In one embodiment, the document log is distributed as XML.

A technique is also disclosed for choosing an identifier which is unique among a large set of documents, and yet can be verified against other paper copies by visual inspection.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Document Logs in General

A log (e.g., document log) consists of a digital object along with one or more sets of metadata. The digital objects can be represented as a sequence of bytes. The digital object may be a document and the metadata may correspond to a set of comments associated with the document. Thus, for each document, there exists a set of comments associated with that document. Comments, which generally consist of text strings, may be documents themselves and could consist of arbitrary byte strings. Comments may be simple text entries that might refer to other documents and can be created by anyone or anything. In the context of a draft technical paper, a set of comments might represent feedback from different reviewers. In the context of a photograph (e.g., jpeg file), the set of comments might include stories about the event depicted in the photograph such as a birthday party. In the context of a patient chart, the set of comments might include references to individual appointments or visits for the patient.

Techniques are described herein for exchanging and merging the lists of comments associated with a document together (without conflicts).

In one embodiment, document logs are represented using a simple XML format that specifies the "anchoring" document and list of entries. For example, a format such as the simple syndication (RSS) format could easily be adapted to serve the same purpose.

In one embodiment, an exchange mechanism is used to enable two nodes to exchange a list of entries. In one embodiment, the nodes use the HTTP GET methods to retrieve the XML file corresponding to a document log and the HTTP POST method to send an XML file or string with entries to a node. For purpose herein, GET will refer to the action of retrieving content associated with a locator, whether used as part of HTTP or not. Alternatively, other exchange mechanisms, including simple file copy operations or even shared file systems may be used.

A node may include a user interface to enable an individual to view and add to the document log entries. Many user interfaces are possible for viewing and adding to document logs. An exemplary user interface is shown in FIG. 1. Referring to FIG. 1, a representation of the anchoring document 101 on the right hand side and document log entries 102 on the left-hand side. On the bottom of the left-hand side is a text box 103 that allows the user to type in a new entry.

FIG. 1 shows a prototype user interface for viewing of a document log. In this example, the document is an image (e.g., corresponding to a patient) and the entries correspond to information about that patient. These entries include links to other documents, such as appointments or procedure results, and their associated logs. Thus, the user interface of FIG. 1 facilitates a hypothetical use for tracking patient information. On the right side of FIG. 1 is a document, in this case a picture of the patient. Log entries 102 are entries associated with the patient. Some of these entries are manually typed in by office staff, physicians, or the patient themselves, and other entries are created automatically by related systems, such as a scheduling system or radiologic imaging machines. For each entry in such a document log, a link to another document may be included in the entry. A small thumbnail 104 of the related document is shown to the right of that entry.

Figure 2:
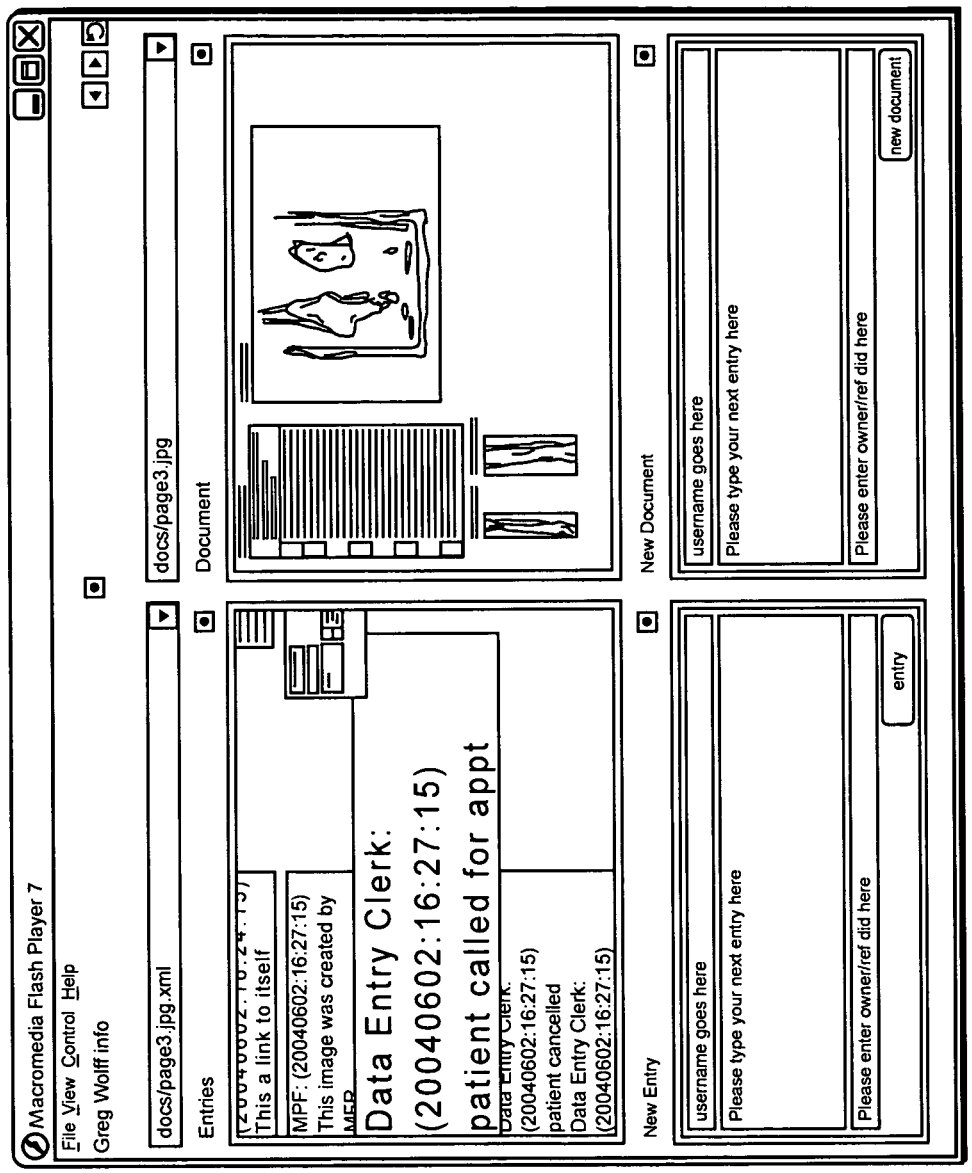
FIG. 2 illustrates the view of a log associated with the radiology image that was referenced by the highlighted comment in FIG. 1.

In one embodiment, the "active" comment underneath the cursor is enlarged with a fisheye effect to enable rapid browsing of many comments within a single list. In one exemplary user interface, entry 105 underneath the mouse cursor is enlarged so as to be easily visible. In the example shown here, the highlighted entry may have been created automatically by a machine in a manner well known in the art. The identifier for the document log shown might have been entered into the machine by use of a bar code or other mechanism on a printed version of this document log. An item that was automatically entered into the original document log includes a link to the document log containing the imaging results created automatically by the imaging machine. Clicking on any of entries 102 takes the user to the document log associated with that entry. Clicking on a comment that has been associated with a link that points to a related document takes the user to the view of the document and log associated with the referenced document. FIG. 2 shows the view of a log associated with the radiology image that was referenced by the highlighted comment in FIG. 1. Referring to FIG. 2, a document that was produced automatically by an x-ray machine and the comments that have been associated with that document are shown.

In some cases, the log associated with the referenced document will have an entry pointing back to the original log containing the link, but in many cases it will not. Navigation tools at the top of this prototype viewer provide forward and backward functions similar to a standard web browser.

In addition to images, document types may include word processing files, flash paper, Excel files, text documents, or any other type of data. In the current system, any single file (or individually addressable unit) can be used as a "document."

Documents as Locations

Conceptually, a document log may represent a virtual space or (file) hierarchy. The orgin of the space—a "root" node—is defined by the document itself. Directory names could be used specify locations of the virtual space. However, in one embodiment, instead of using directory names to specify location, the hash values of the documents themselves are used to specify location of documents and comments on the virtual space or file hierarchy. For example, /A/C represents a comment (c with C=SHA1(c)) on a document (a with A=SHA1(A)), where SHA1 is a hash function that maps an arbitrary sequence of bytes into a fixed size sequence. That is, the letter A is used to indicate the hash of object a, A=SHA1 (a) where A represents any sequence of bytes. For example the string "This is a character string." maps into '97d981dad06b03622cbf8e1a5642724cbcae64f8' (using hexadecimal notation).

The storage associated with this representation could be a standard directory structure, for example, A as the name of a directory and C as the name of a file containing the comment on a. Other storage mechanisms, such as a database using the hash values as primary keys, would work equally well and any node may use one or more such storage mechanisms. A confusing case in which the value of a is itself a string which can be interpreted as a path or a uniform resource locator (URL). If a='http://foo.com/path/to/file.ext' then it may be ambiguous whether c is a comment about the location, is a comment about a web page whose contents might change, or a comment about the contents of that web page at some particular point in time. In the latter case, it is safer to use the hash of the contents (if available) as the anchoring document rather than the hash of the reference string as the anchor.

Note that if a is a string and a valid URL, then individual nodes may choose to combine comments on the string as well as comments on the "known" contents that have been obtained from that URL. Also note that by convention, the document log of a might include an entry for each of the contents that has been available from a along with the pointers to the document log associated with this particular contents.

For purposes of the description herein, in one embodiment, a document is an immutable object identical to a particular sequence of bytes, and the hash value of a document is used as a reference to that document. Since different versions of a document have different hash values, the different versions are considered to be different documents. (By convention if D2 is a new version of document D1, the log of document D1 will have an entry pointing to D2 and the log of D2 will have an entry pointing back to D1.)

More specifically with respect to the use of hash functions and directory structures, for example, a JPEG file, a Word document, a postscript document, a text string, etc. $a_u$ indicates a location (e.g., a URL) of object a, such as http://www.server.com/path/a.jpg or file:///path/to/a.jpg $$a=GET(a_u)$$

(a is the result of retrieving $a_u$)

Let $A_u$ denote the set of locations $a_u$ for which SHA1(GET$(a_u)$)==A

Each element of $A_u$ corresponds to a location which returns the digital object, that is a string representation of a.

A new "virtual" SHA1 protocol may be defined as follows: SHA1://host.name/A/B/C that represents a relationship between A, B, C and their corresponding values, a, b, and c. The value b is a comment (or document log entry) on a, while c is a comment on b.

As with any URL, if GET(SHA1://host.name/A/B/C) succeeds, it returns some content as a string of bytes. Unlike other protocols, this content is c and therefore is not just identical for any host, but is also be immutable. In other words, it is an error if SHA1(GET(SHA1:// . . . /C)) does not equal c. Thus, if a node has a copy of c, then it does not need to perform any communications to return GET (SHA1:// . . . /C) (assume that clients compute SHA1(c) and store the results and any lookup table using C as the key).

Note that just as the same image file may be located in several places, the same comments may be related to several documents. If c is a comment on b, then both SHA1:///A/B/C and SHA1:///B/C are valid URLs. The comment c might also be a comment on document X, in which case SHA1:///X/C would also be valid. Valid in this sense means that someone or some process actually added c as a comment on documents x and b Document Log Listings By convention a trailing slash is used to indicate a listing of comments associated with a document. In one embodiment, GET(SHA1://host.com/A/) returns from host.com a listing of comments on document a (a standard XML format). Likewise, SHA1://foo.com/A/refers to a listing from host foo.com./A/ is a reference to the locally known comments on a. SHA1://host.com/A/C/ refers to a listing of comments on comment a from host.com, etc.

An exemplary algorithm for performing lookup of H/A/C is as follows:

a) check local storage for C (storage can be hash table, database, file directory, etc.)

b) if available, then get and return associated value (e.g., content) (Note if instead the set, C/, is being looked up, then add the associated set to results and (optionally) continue check local storage for A, if found, then get associated set of comments)

c) compute hashes of comments d) if any comment has hash C, return that comment e) look up domain name H (which may also be a hash of the string corresponding to a URL, which is handled below)

f) send GET request to H with A/C g) return results (and optionally check for valid hash)

h) send the request to one or more preconfigured servers (note that the servers may have been previous locations for getting A or a)

i) if H is a hash of a URL, h, then use that URL in a normal GET request that should return a The h/ or h.xml or similar standard variations on h can be used by the client as a request to the server for list of comments (e.g., XML file), which can be used to compute C (e.g., if c is of the entries in that file).

Clients may also maintain a list mapping A to u1 and u2, where u1 is a set of locations from which the client has obtained a (or information based on a) and u2 are locations containing comments on a (e.g., XML files). In an alternative embodiment, the client may simply look up u2, retrieve the associated set(s) of comments, and attempt to compute C.

Mapping Between SHA1: and HTTP:URLs

In one embodiment, clients define and maintain their own mapping from particular contents to locations. For example, suppose r is the contents of Ricoh Innovations homepage. Then $r_u$ is http://www.rii.ricoh.com/ and R='c2c0bfe479dd6da1d58ec4d0c42c5c7c10a1acfe' (that is the hash value of 'Welcome to RII' which for this example is the entire contents of index.html==r).

In this case, a client might maintain an internal table with the following entries:

| SHA1 (R) | HTTP: ($r_u$) | Notes |
| --- | --- | --- |
| c2c0bfe479dd | http://www.rii.ricoh.com/ | The "original" URL. (Note that the hash value has been truncated here to conserve space) |
| | /cache/c2c0bfe479dd/file.html | a local copy of the document contents |
| /c2c0bfe479dd/ | http://www.rii.ricoh.com/rss.xml | A conventional place to find comments associated with a particular web site. |
| | /cache/c2c0bfe479dd/rss.xml | Local listing of known entries on this document. |

Note that the hash values do not need to be of the same length. In particular, the more bits of the hash value that are specified, the more "secure" the value is. Therefore, in cases where an encryption key, K, is used to encrypt information in documents and/or their log entries as discussed herein as being based on the content and an identifier, I, based on the content, K and I could be different portions of the output of the same algorithm or they could be the output of different algorithms. That is, although I is the hash of x and K is the hash of I. Equally well, I could be the first 80 bits and K could be bits 81-160 of the same hash computation.

Note that there is no requirement for a node or server which stores, processes, presents, or adds to a document log for A to actually have access to the content a. However, by convention for a server, for example, cache.com, that actually does have a cache or copy of the contents of documents, it can provide those contents in response to requests for the document, such as http://cache.com/A, and provide the list log entries in response to http://cache.com/A/. In this case, the path component of the HTTP: and SHA1: URLs that refer to the same document could be identical.

To retrieve an individual comment, the client might request http://cache.com/A/C (Again, note that cache.com may have access to and return c even if it does not have access to a.) If c refers to another document, b by location (e.g., HREF=HTTP://foo.com/b.html so $b_u$=HTTP://foo.com/b.html), then the client might be able to retrieve b from $b_u$, calculate B and locate the document log entries associated with B, via GET(SHA1:///B/). In one embodiment, by default the client checks and integrates log entries from several locations including the rendezvous point (the synchronizing server), its local cache, foo.com/b.html.xml, and so forth.

Of course, c might also specify that link by a SHA1: URL (e.g., $b_u$=SHA1:/B) in which case the client uses some mechanism for identifying the location from which to download the actual contents b if it did not already have b or an alternative HTTP: version of $b_u$.

Synchronization Between Two Nodes

In one embodiment, an individual client keeps a local cache of entries for each document. These may be stored in a hash table. The local cache may be any memory space or storage location. In one embodiment, the entry for each hash consists of 2 parts. The first part is either a string containing the actual content itself and/or one or more pointers to the actual content (if available), and the second part is a list of hash values that correspond to comments on this document. The client can be configured to check one or more places for lists of entries. In one embodiment, a default location is a rendezvous point, or synchronizing server, which might be checked periodically, such as, for example, whenever the user views a document.

When the client obtains additional entries, e.g., the result of a GET operation, those entries are added to the local cache (consistency checks may be done to ensure that the content is equal to the hash value) and the local list of entries is updated to reflect the new entries. (Information such as the sequence number obtained from a synchronizing server may be used to order this list for presentation.)

Note that nodes in one embodiment of the system of exchange are symmetric. The only difference between a client and server is that the client is defined as the machine that initiates communication—using GET to retrieve an entry listing or POST to send a listing. Of course, different nodes (in particular ones that act as servers) might also differ in their configuration, most especially in whether or not will accept entries from particular nodes (clients).

Nodes might keep track of their communication with other nodes (either other clients or servers) and send only "new" entries to the other node (either via a POST or in response to a GET).

Also note that additional exchange protocols may be used, such as, for example, simply copying and appending the contents of two XML files that refer to the same document log into a single file.

Any number of XML representations could be used for the document log entries. FIG. 3 shows an exemplary sketch of a XML file that represents the log associated with document A. In addition to the content ("First comment on doc A"), each entry has a number of attributes that may be assigned by the originator of the entry or another node. In FIG. 3, the SEQ attribute is assigned by the rendezvous point server. This XML document itself would be returned in response to a query for the document log associated with A, by convention this query takes the form //rp.com/A/ where "rp.com" is the host name for the rendezvous point. (Other servers/hosts would return their own versions of this listing. The sequence numbers provided by the rendezvous point are designated as "canonical.") Note that the HREF attribute on an entry specifies a link to another document similar to the HREF attribute of an anchor ···¿ a href=···¿ <a href= . . . >tag in HTML. Likewise, the SRC tag is analogous to the SRC attribute of the HTML IMG tag and specifies the source of a thumbnail image representing the referenced document.

Another possibility would be to use the existing really simple syndication (RSS) schema. A simple extension to RSS that identifies the base document ("anchor") for the RSS feed would enable the uses identified herein. Alternatively, instead of extending RSS, existing fields in RSS may be used.

Merging comments is not an issue since comments are stored according to their hash value. Note that in addition to the (text) value, attributes such as, for example, author and date may be used in the computation of the hash value, C.

Figure 4:
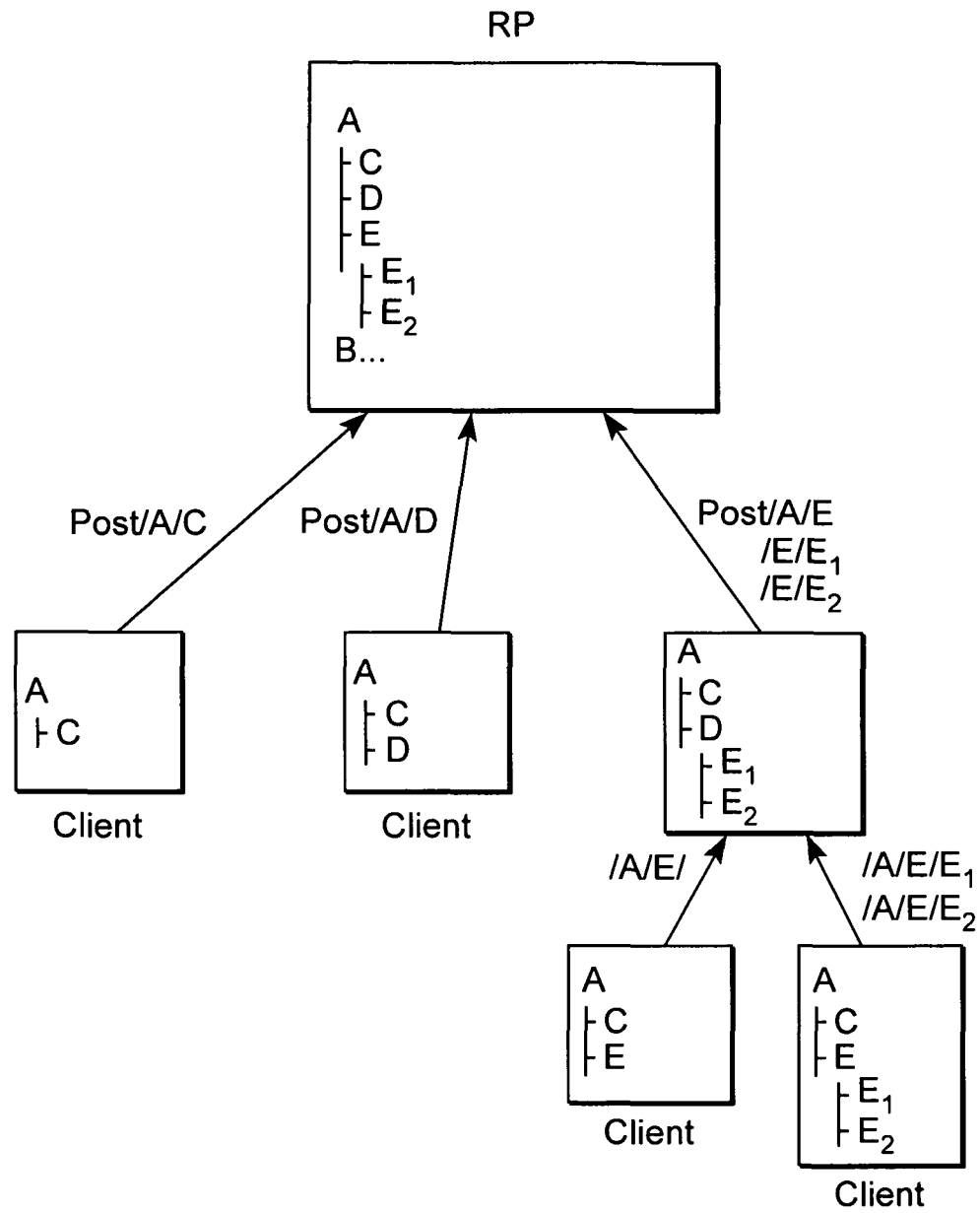
FIG. 4 is a diagram depicting the configuration of clients that submit entries to the rendezvous point for a particular document.

FIG. 4 is a diagram depicting the configuration of clients that submit entries to the rendezvous point for a particular document. Referring to FIG. 4, the overall diagram showing submission of entries from clients to the rendezvous point. Note that some clients may POST entries directly to the rendezvous point, while others may go through intermediary nodes. Since entries are referenced and stored by their hash values, any node can exchange entries directly with any other node without worry of a conflict. Individual nodes can also assign their own ordering to the sequence of entries. The ordering provided by the rendezvous point is, by convention, treated as the canonical ordering. Note that the original creator of a document might specify a rendezvous point or "root" for the log entries associated with that document by specifying the root or rp attribute of the initial ...¿ doc......¿ element. Note however that a document log may be created by anyone, not necessarily just the creator of the document. (The creator of a document does have the first opportunity to register an initial log entry on the document.) Other nodes may or may not choose to use the root attributes specified in the document element. Document entries may be made while off-line and later automatically synchronize those entries with one or more servers.

The order of entries seen by the rendezvous point may differ from the actual creation order (especially if some clients are off-line at creation time). Also the intermediate nodes might aggregate entries from multiple other nodes and submit.

On the server side for the rendezvous point, in one embodiment, sequence numbers are assigned in the order in which they are received. Separate configuration and confirmation of user identity (e.g., posting authority) can be handled in any one of several ways. These include username and password verification, IP address testing, session identifiers, and the like. In some cases for encrypted content, the user might have to prove (through cryptographic methods) that they actually know the encryption key A (and/or the content a).

Problems Associated with Document Scanning and their Associated Hashes

The contents of an electronic document can be thought of as a series of page images, each of which is represented as a long string of bits. To compute a cryptographic hash, the entire sequence of bits is passed through a function, and a single string of fixed size is returned from the function. These hashes are characterized by a fairly strict set of properties:

1) The resulting string must be impossible to invert and produce the original document. This distinguishes hashing from compression. Hashes are quite lossy.

2) The resulting string must appear random, and be as uniformly distributed as possible over the range of values the hash can produce. It should be difficult if not impossible to determine how closely correlated two different input strings are by examining their respective output strings.

These properties cause difficulty when relating physical pieces of paper to document logs, because of the inevitable differences between scans of a paper document. The process of scanning produces slightly different bits every time a paper is scanned. Errors in registration, differences in scanner illumination, and dirt or marks on the paper all change the bits slightly. As a result, if two scans of a given document are passed through a cryptographic hash algorithm, two apparently unrelated result strings are generated, with no way to correlate them.

In one embodiment, a machine readable code is placed onto the paper where the contents of the code are intimately connected to the document content but still useful as a document hash. More specifically, in one embodiment, a technique to overcome the problem identified above includes producing a document hash by scanning the bits of a document to produced a cryptographic hash, converting the cryptographic hash into to a machine readable code, and then rewriting the document with the code inserted therein. For purposed herein, the machine readable code a "hash mark".

The following discussion provides additional details to processes involving creating the paper document with a hash mark, and reading such documents. Additional disclosure is provided regarding a process for detecting that a different copy of the same document has already been marked.

Creating Hash Marked Pages

The machine readable code may be placed or inserted in a number of locations in a document. Since pages can be marked virtually anywhere, in one embodiment, applying an additional mark is performed in a way that avoids overwriting existing marks if possible. In one embodiment, a list of possible bounding rectangles, each large enough to hold a machine readable code whose payload is a cryptographic hash function result. For example, SHA256 is a hashing algorithm that returns 256 bit strings. The machine readable code is suitably sized to allow reliable reading at a resolution appropriate to the envisioned use. For any chosen hashing algorithm, resolution, and code symbol technology, a fixed size rectangle that can contain the code is computed.

Some areas are statistically far more likely than others to contain hash marked areas. These areas near the margins and corners, for example, are more often blank than the center of the page in typical business documents. Aesthetically, the center is also a poor choice of location because it will be distracting to a reader. Any of numerous methods and criteria might be employed, but the end result will be a list of choices, in priority order, where a hash mark can best be placed on a page. For purposes herein, this list is referred to as the locust. For example, a simple approach is to choose a list of rectangles in the corner margin areas of a page, where most ordinary documents leave white space. For aesthetic reasons, on an English page, it may be better to choose the bottom right corner when that area is blank, followed by the top right corner, followed by the bottom left, followed by the top left corner. This list is based on preferred reading order of English text. Other approaches might take into account font size of nearby text, or the presence of images, or column layout, or large whitespace areas at the end of text flows.

Some areas are statistically far more likely than others to contain hash marked areas. These areas near the margins and corners, for example, are more often blank than the center of the page in typical business documents. Aesthetically, the center is also a poor choice of location because it will be distracting to a reader. Any of numerous methods and criteria might be employed, but the end result will be a list of choices, in priority order, where a hash mark can best be placed on a page. For purposes herein, this list is referred to as the loclist. For example, a simple approach is to choose a list of rectangles in the corner margin areas of a page, where most ordinary documents leave white space. For aesthetic reasons, on an English page, it may be better to choose the bottom right corner when that area is blank, followed by the top right corner, followed by the bottom left, followed by the top left corner. This list is based on preferred reading order of English text. Other approaches might take into account font size of nearby text, or the presence of images, or column layout, or large whitespace areas at the end of text flows.

In one embodiment, a process to create a hash marked page includes examining each rectangle of the loclist in order. If a machine readable code is located there, and appears to be of the correct sort, the document is assumed to be already marked and process ends. If no marks are found, all pages of the document are scanned and a cryptographic hash of the document contents is computed. The document contents and computed hash are stored in a memory (e.g., database) for later verification. The process then encodes the hash results in the chosen machine readable (e.g., a barcode), thereby creating a hash mark. A copy of the hash mark is placed into the document image, at the first open position available in the image, as specified by the loclist. Then the document image is returned to the user, as a printed page, image file, fax, or some other representation. It should be noted that the chosen area for marking might not be blank, but instead contain an area that can be readily marked by steganographic means. For example, one might note the presence of an existing photo image at the chosen loclist position, and choose to rewrite the page by performing a steganographic alteration of that image. Such techniques are well known in the art, and any of several techniques could be applied.

Figure 5:
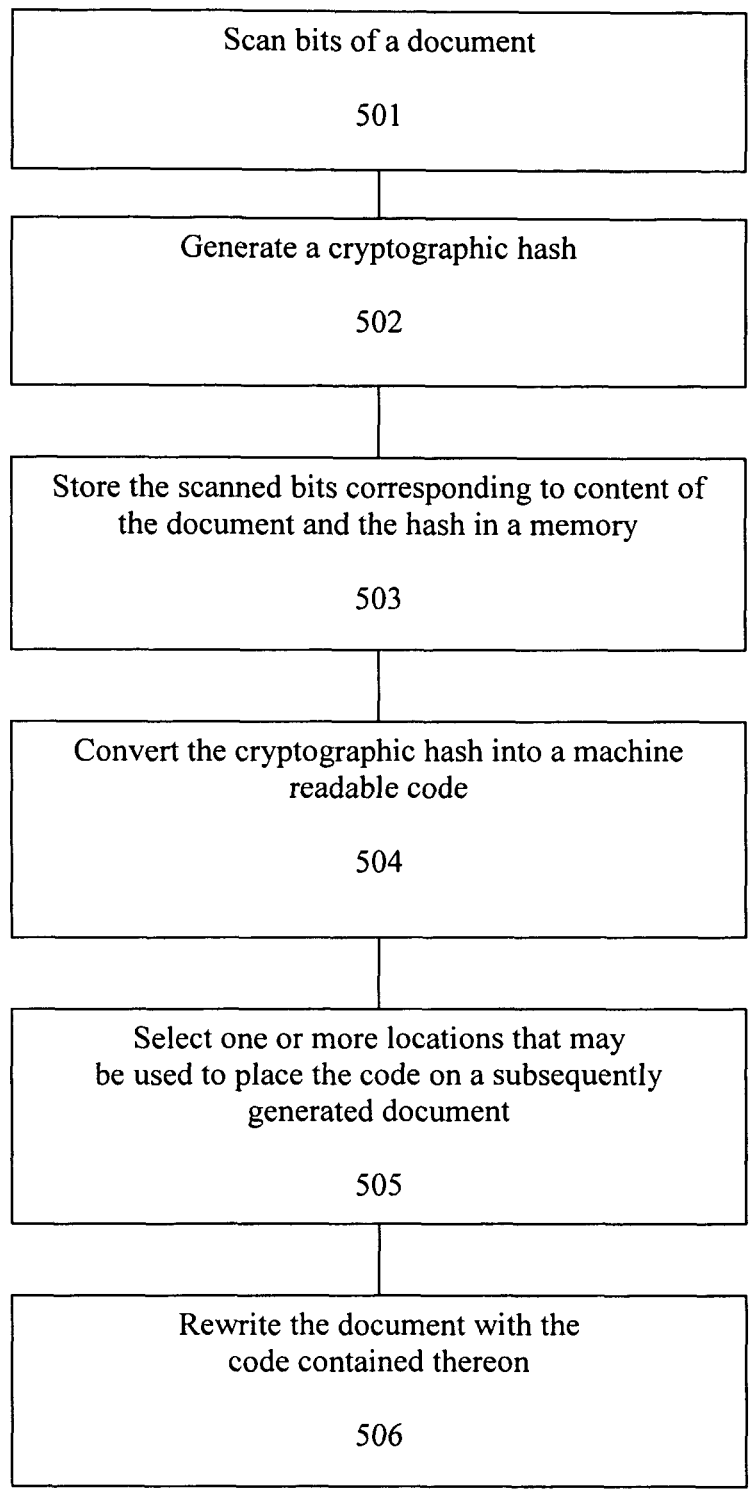
FIG. 5 is flow diagram of one embodiment of a process for creating hash marked pages.

Referring to FIG. 5, the process begins by processing logic scanning bits of a document (processing block 501). Based on the scanned bits, processing logic generates a cryptographic hash (processing block 502).

Optionally, processing logic stores the scanned bits corresponding to content of the document and the hash in a memory (e.g., a database) (processing block 503).

Next, processing logic converts the cryptographic hash into a machine readable code (processing block 504). Processing logic also selects one or more locations that may be used to place the code on a subsequently generated document (processing block 505). In some cases, the code is always placed at the same location in all documents. In other case, multiple locations may be used. For example, in one embodiment, the locations are selected based on one or more features such as, for example, but not limited to, the document size, the probability of ordinary documents having content that fills all or a portion of that area, and one or more aesthetic placement considerations.

Once the location for the code has been identified, processing logic rewrites the document with the code contained thereon (processing block 506). In one embodiment, rewriting the document with the code comprises placing the mark over a blank area on the document.

In one embodiment, prior to scanning all of the pages of a document, processing logic examines the document to determine if it already contains a machine readable code that specifies a cryptographic hash associated with a document log. The examination of the document may include examining locations of the document specified in a list, where the locations are the most likely, or only, places on the document where such a code may appear. Note that if a code is found, processing logic does not scan bits of the document.

Figure 6:
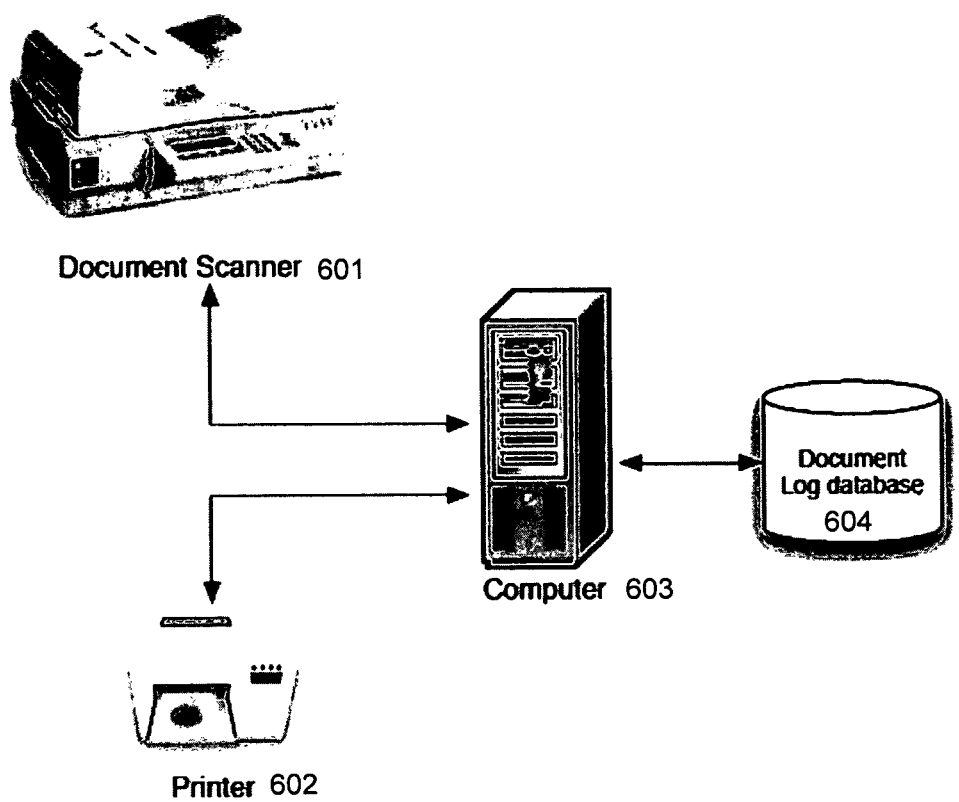
FIG. 6 is a block diagram of one embodiment of such a system.

In one embodiment, the process of FIG. 5 is performed by a system. FIG. 6 is a block diagram of one embodiment of such a system. Referring to FIG. 6, the system comprises a document scanner 601 and a printer 602 coupled to a computer 603. Computer 603 is also coupled to a document log database (or other memory) 604.

Log Identification Via Hash Marked Page Read

When reading a page and attempting to find hash marks, the entire document may be analyzed. Alternatively, in one embodiment, the loclist list of rectangles is scanned in preferred order to locate a hash mark. If a mark is found that is appropriate (contains a cryptographic hash), it is used. The contents of the mark are used as the identifier for the correct document log. With access to the original scan, the document scan can be checked against the contents of a memory (e.g., a database) to be sure that the document is pointing to the correct log.

Figure 7:
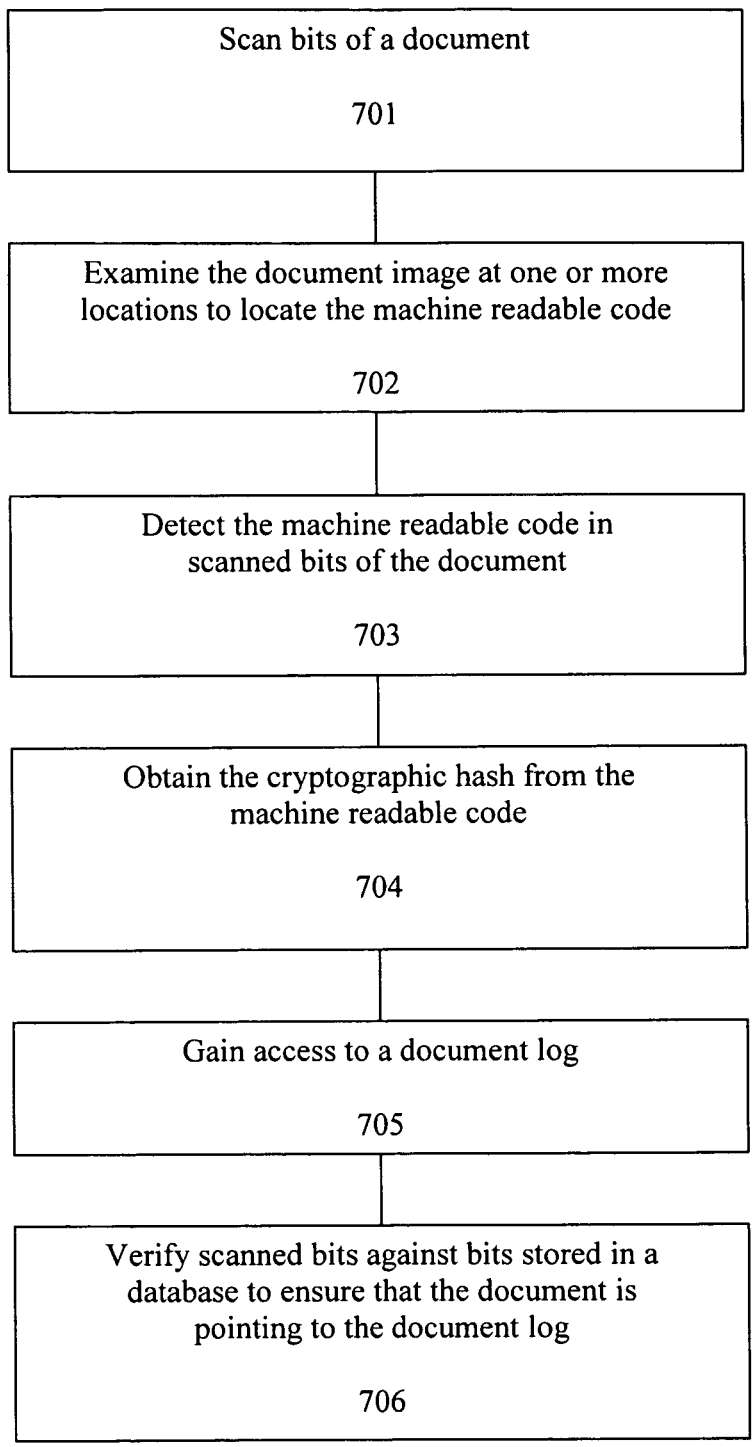
FIG. 7 is a flow diagram of one embodiment of a process for identifying a document log by reading a document page having a hash mark thereon.

FIG. 7 is a flow diagram of one embodiment of a process for identifying a document log by reading a document page having a hash mark thereon. The process is performed by processing logic that may comprise hardware (circuitry, dedicated logic, etc.), software (such as is run on a general purpose computer system or a dedicated machine), or a combination of both.

Referring to FIG. 7, the process begins by processing logic scanning bits of a document (processing block 701). The scanned bits form a document image. Processing logic examines the document image at one or more locations to locate the machine readable code (processing block 702). In one embodiment, the locations are specified in a list of potential locations. In one embodiment, the list of potential locations is scanned in a predetermined order.

Processing logic detects the machine readable code in scanned bits of the document (processing logic 703) and obtains the cryptographic hash from the machine readable code (processing block 704).

In one embodiment, using the cryptographic hash obtained from the machine readable code as an identifier, processing logic gains access to a document log (processing logic 305).

Optionally, processing logic verifies scanned bits against bits stored in a database to ensure that the document is pointing to the document log (processing logic 706).

Figure 8:
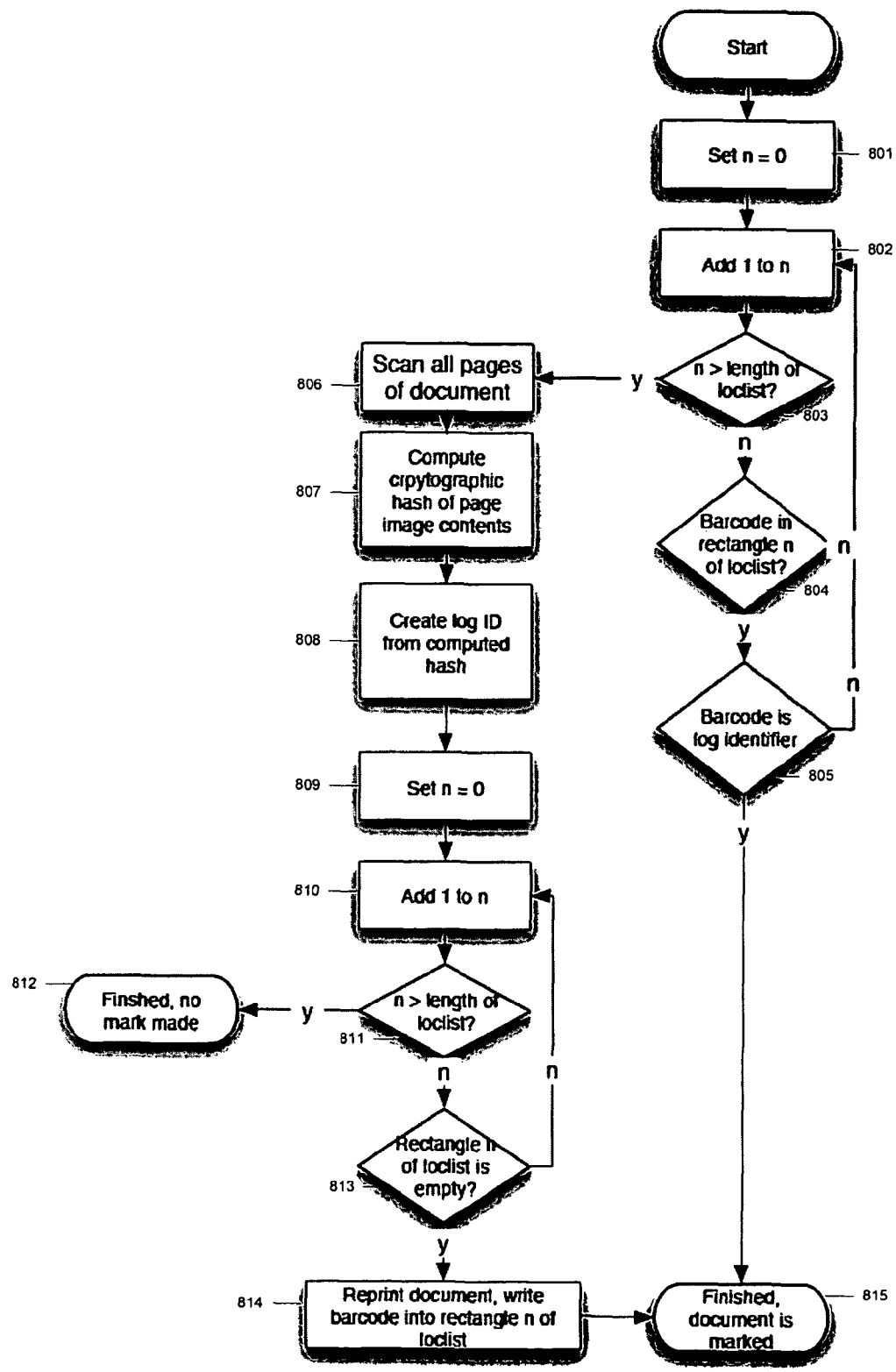
FIG. 8 is a more detailed flow diagram of one embodiment of a process for identifying a document log by reading a document page having a hash mark thereon.

FIG. 8 is a more detailed flow diagram of one embodiment of a process for identifying a document log by reading a document page having a hash mark thereon. The process is performed by processing logic that may comprise hardware (circuitry, dedicated logic, etc.), software (such as is run on a general purpose computer system or a dedicated machine), or a combination of both.

Referring to FIG. 8, the process begins by processing logic initially sets an index variable n equal to zero (processing block 801). The process continues with processing logic incrementing the index n by 1 (processing block 802) and testing whether n is greater than the length of a list, loclist, containing potential locations in a document where a machine readable code containing a cryptographic hash may be contained (processing block 803). If not, processing logic tests whether there is a machine readable code (e.g., a barcode) is contained in the rectangle n of the location list, the loclist. If not, processing transitions to processing block 802 where processing continues. If so, processing logic tests whether the machine readable code is a log identifier (processing block 805). If not, processing transitions to processing block 802 where processing continues. If so, processing logic transitions to processing block 815 where processing ends (as the document is already marked).

If index n is greater than the length of the loclist, processing transitions to processing block 816 where processing logic scans all the pages of the document. After scanning, processing logic computes a cryptographic hash of the page image contents (processing block 807) and creates a log ID from the computed hash (processing block 808).

Once the log ID has been created, processing logic resets the index n to zero (processing block 809) and increments the index n by one (processing block 810). Thereafter, processing logic tests whether index n is greater than the length of the loclist (processing block 811). If it is, the process ends and no mark is made to the document (processing block 812). If not, processing logic tests whether the rectangle n of the loclist is empty (processing block 813). If not, processing transitions to processing block 810 and the process continues from there. If so, processing logic reprints the document and writes the machine readable code into rectangle n of the loclist (processing block 814) and the process finishes (processing block 815).

Associating New Scans with Previously Hashed Marked Scanned Documents

At times, a document arrives into an organization through multiple paths. If so, there may be several "unmarked" versions of a document that arrive in different places at different times. In one embodiment, these documents are marked with identical hash marks. If a document image has been previously stored, and a hash mark associated with it, it may be tractable to quickly find the correct document hash mark in an image database by comparing the document images. For example, the list of documents may be narrowed by simple classifiers such as, for example, but not limited to, number of columns, presence of header and footer, optical character recognition (OCR) term frequencies, and so on. Once the list of candidate documents in the database is suitably small, an exhaustive comparison based on scaling, skew detection, and so on might prove equivalence beyond reasonable doubt, and allow the same hash mark to be used with respect to the new unmarked paper sheet.

In one embodiment, to implement such a scheme, the above-referenced processes for creating hash marked pages are modified to perform other functions if no mark is found. That is, the process includes scanning all the pages of a document if not marked and found and then checking the document image against a database of known marks. If a match is present, the associated cryptographic hash of the matching document is used. Otherwise, a cryptographic of the document image representation is computed. As above, if not already known, the document contents and computed hash are stored in memory (e.g., a database) for later verification.

Figure 9:
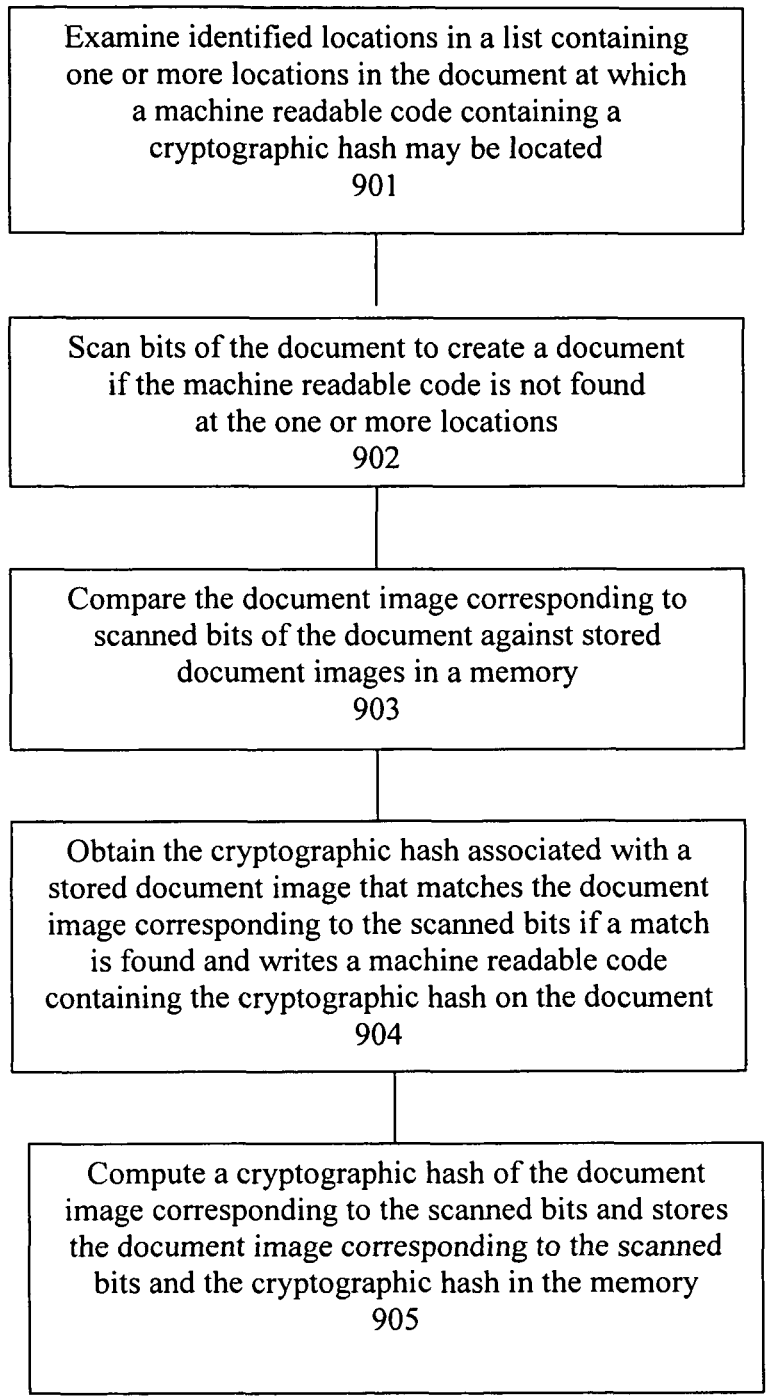
FIG. 9 is a flow diagram of a process for associating a document with one or more documents that have previously been scanned and had cryptographic hash.

FIG. 9 is a flow diagram of a process for associating a document with one or more documents that have previously been scanned and had cryptographic hash. The process is performed by logic that may comprise hardware (circuitry, dedicated logic, etc.), software (such as is run on a general purpose computer system or a dedicated machine), or a combination of both.

Referring to FIG. 9, the process begins by processing logic examining identified locations in a list containing one or more locations in the document at which a machine readable code containing a cryptographic hash may be located (processing block 901). Processing logic then scans bits of the document to create a document if the machine readable code is not found at the one or more locations (processing block 902) and compares the document image corresponding to scanned bits of the document against stored document images in a memory (processing block 903). Upon locating a match, processing logic obtains the cryptographic hash associated with a stored document image that matches the document image corresponding to the scanned bits if a match is found and writes a machine readable code containing the cryptographic hash the document (processing block 904).

If a match is not located, processing logic computes a cryptographic hash of the document image corresponding to the scanned bits and stores the document image corresponding to the scanned bits and the cryptographic hash in the memory (processing block 905).

An Exemplary Computer System

Figure 10:
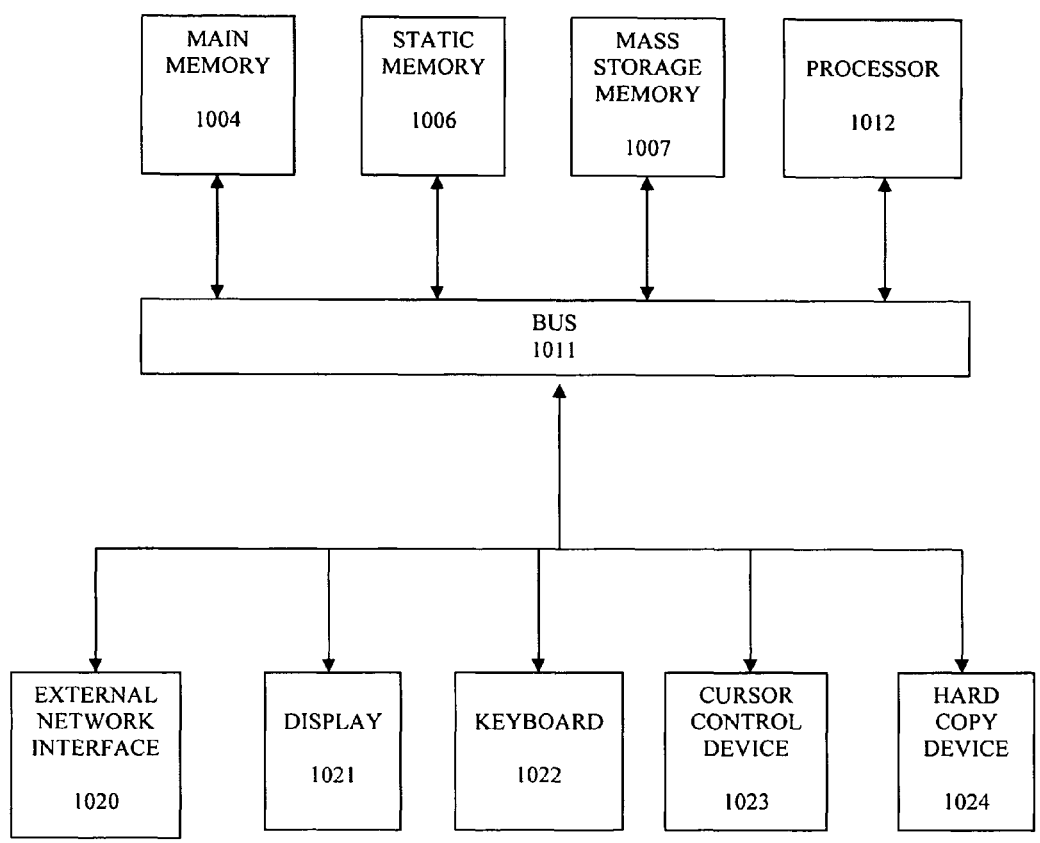
FIG. 10 is a block diagram of one embodiment of a computer system.

FIG. 10 is a block diagram of an exemplary computer system that may perform one or more of the operations described herein. Referring to FIG. 10, computer system 1000 may comprise an exemplary client or server computer system. Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium™, PowerPC™, etc.

System 1000 further comprises a random access memory (RAM), or other dynamic storage device 1004 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, track pad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for marking information on a medium such as paper, film, or similar types of media. Another device that may be coupled to bus 1011 is a wired/wireless communication capability 1025 to communication to a phone or handheld palm device.

Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
   sequentially examining identified locations of a document in a prioritized ordering of a list that contains a plurality of document locations that are statistically more likely to contain a machine readable code than document locations that are not in the list, wherein each identified location in the prioritized ordering of the list corresponds to a particular region on a page of the document, and wherein the prioritized ordering of identified locations to be examined is prioritized based on a determined layout of content within the document;
   scanning bits of the document;
   generating, with a processor, a cryptographic hash from the scanned bits of the document, the cryptographic hash identifying the document for document logging;
   converting the cryptographic hash into the machine readable code;

rewriting the document with the code contained in a region of the document corresponding to a first identified location in the prioritized ordering of the list of identified locations where the region is empty; and using the cryptographic hash as an identifier to a document log with one or more sets of metadata entries associated with the document, wherein each of the one or more sets of metadata entries are sets of related user generated comments that are associated with the document.

2. The method defined in claim 1, wherein scanning bits of the document occurs when the code is not at the one or more locations.

3. The method defined in claim 2 further comprising storing scanned bits corresponding to content of the document and the hash in a database.

4. The method defined in claim 1 further comprising selecting a plurality of locations for the code on the document.

5. The method defined in claim 4 wherein the plurality of locations are selected based on one or more of a group consisting of size, probability of ordinary documents filling that area, and an aesthetic placement consideration.

6. The method of claim 1, wherein at least one user generated comment from the sets of user generated comments includes a comment directed to the document that includes a link that points to a related document and corresponding document log.

7. A non-transitory computer-readable storage medium with instructions stored thereon which, when executed by a system, cause the system to perform a method comprising:

sequentially examining identified locations of a document in a prioritized ordering of a list that contains a plurality of document locations that are statistically more likely to contain a machine readable code than document locations that are not in the list, wherein each identified location in the prioritized ordering of the list corresponds to a region on a page of the document, and wherein the prioritized ordering of identified locations to be examined is prioritized based on a determined layout of content within the document;

scanning bits of a document;

generating a cryptographic hash from the scanned bits of the document, the cryptographic hash identifying the document;

converting the cryptographic hash into a the machine readable code;

rewriting the document with the code contained in a region of the document corresponding to a first identified location in the prioritized ordering of the list of identified locations where the region is empty; and using the cryptographic hash as an identifier to a document log with one or more sets of metadata entries associated with the document, wherein each of the one or more sets of metadata entries are sets of related user generated comments that are associated with the document.

8. The computer-readable storage medium in claim 7, wherein scanning bits of the document occurs when the code is not at the one or more locations.

9. The computer-readable storage medium in claim 8 wherein the method further comprises storing scanned bits corresponding to content of the document and the hash in a database.

10. The computer-readable storage medium in claim 7 wherein the method further comprises selecting a plurality of locations for the code on the document.

11. The computer-readable storage medium in claim 10 wherein the plurality of locations are selected based on one or more of a group consisting of size, probability of ordinary documents filling that area, and an aesthetic placement consideration.

12. A method comprising:

sequentially examining identified locations of a document in a prioritized ordering of a list that contains a plurality of document locations that are statistically more likely to contain a machine readable code than document locations that are not in the list, wherein each identified location in the prioritized ordering of the list corresponds to a particular region on a page of the document, and wherein the prioritized ordering of identified locations to be examined is prioritized based on a determined layout of content within the document;

generating, with a processor, a machine readable code whose contents are associated with document content when the code is not found in a location specified in the list, wherein the machine readable code encodes a cryptographic hash that is computed from the contents of the document and identifies the document;

creating a paper version of the document with the machine readable code contained in a region of the paper version of the document corresponding to a first identified location in the prioritized ordering of the list of identified locations where the region is empty; and using the cryptographic hash as an identifier to a document log with one or more sets of metadata entries associated with the document, wherein each of the one or more sets of metadata entries are sets of related user generated comments that are associated with the document.

13. A method comprising:

scanning bits of a document;

detecting, with a processor, a machine readable code in scanned bits of the document, wherein the machine readable code is a code that has been added to a region of the document corresponding to a first identified location in a prioritized ordering of a list of identified locations where the region is empty, and wherein the machine readable code encodes a cryptographic hash that is computed from contents of the document and identifies the document for document logging, and the machine readable code is detected by sequential examination of identified locations of the document in the prioritized ordering of the list that contains a plurality of document locations that are statistically more likely to contain the machine readable code than document locations that are not in the list, wherein each identified location in the prioritized ordering of the list corresponds to a particular region on a page of the document, and wherein the prioritized ordering of identified locations examined is prioritized based on a determined layout of content within the document;

gaining access to a document log using contents of the machine readable code as an identifier, wherein the contents of the machine readable code include a cryptographic hash computed from the scanned bits of the document, and wherein the document log includes one or more sets of metadata entries associated with the document, wherein each of the one or more sets of metadata entries are sets of related user generated comments that are associated with the document.

14. The method defined in claim 13 further comprising verifying scanned bits against bits stored in a database to ensure that the document is pointing to the document log.

15. The method defined in claim 13 wherein the list of potential locations is scanned in a predetermined order based on decreasing statistical likelihood that a particular potential location is likely to contain the machine readable code.

16. A non-transitory computer-readable storage medium with instructions stored thereon which, when executed by a system, cause the system to perform a method comprising:
sequentially examining identified locations of a document in a prioritized ordering of a list that contains a plurality of document locations that are statistically more likely to contain a machine readable code than document locations that are not in the list, wherein each identified location in the prioritized ordering of the list corresponds to a particular region on a page of the document, and wherein the prioritized ordering of identified locations to be examined is prioritized based on a determined layout of content within the document;
scanning bits of the document;
detecting the machine readable code in scanned bits of the document, wherein the machine readable code is a code that has been added to a region of the document corresponding to a first identified location in the prioritized ordering of the list of identified locations where the region is empty, and wherein the machine readable code encodes a cryptographic hash that is computed from contents of the document and identifies the document for document logging; and
gaining access to a document log using contents of the machine readable code as an identifier to the document log, wherein the document log includes one or more sets of metadata entries associated with the document, wherein each of the one or more sets of metadata entries are sets of related user generated comments that are associated with the document.

17. The computer-readable storage medium in claim 16 wherein the method further comprises verifying scanned bits against bits stored in a database to ensure that the document is pointing to the document log.

18. The computer-readable storage medium in claim 16 wherein the list of potential locations is scanned in a predetermined order.

19. A method comprising:
sequentially examining, with a processor, identified locations of a document in a prioritized ordering of a list that contains a plurality of document locations that are statistically more likely to contain a machine readable code than document locations that are not in the list, wherein each identified location in the prioritized ordering of the list corresponds to a particular region on a page of the document, and wherein the prioritized ordering of identified locations to be examined is prioritized based on a determined layout of content within the document;
scanning bits of the document if the machine readable code is not found at the one or more locations;
comparing the document image corresponding to scanned bits of the document against stored document images in a memory; and
obtaining a cryptographic hash associated with a stored document image that matches the document image corresponding to the scanned bits if a match is found, the cryptographic hash that is computed from contents of the stored document and identifies the document for document logging, wherein the cryptographic hash is an identifier to a document log for the stored document image, and wherein the document log includes one or more sets of metadata entries associated with the stored document, wherein each of the one or more sets of metadata entries are sets of related user generated comments that are associated with the document;
computing a cryptographic hash of the document image corresponding to the scanned bits if a match is not found in the memory; and
storing the document image corresponding to the scanned bits and the cryptographic hash in the memory, wherein the cryptographic hash is added to a region of the document image corresponding to a first identified location in the prioritized ordering of the list of identified locations where the region is empty.

\* \* \* \* \*